A. S. HOWELL.
MOTION PICTURE MACHINE.
APPLICATION FILED OCT. 25, 1911. RENEWED JULY 26, 1912.

1,038,586.

Patented Sept. 17, 1912.

3 SHEETS—SHEET 1.

Witnesses:
W. H. Eichelman.
M. A. Milord

Inventor:
Albert S. Howell
By Frederick Benjamin
Atty.

A. S. HOWELL.
MOTION PICTURE MACHINE.
APPLICATION FILED OCT. 25, 1911. RENEWED JULY 26, 1912.

1,038,586.

Patented Sept. 17, 1912.

3 SHEETS—SHEET 2.

Witnesses:
W. H. Eichelman.
M. A. Milord.

Inventor:
Albert S. Howell
By Frederick Benjamin
Atty.

A. S. HOWELL.
MOTION PICTURE MACHINE.
APPLICATION FILED OCT. 25, 1911. RENEWED JULY 26, 1912.
1,038,586.
Patented Sept. 17, 1912.
3 SHEETS—SHEET 3.
Fig. 3.
Fig. 4.
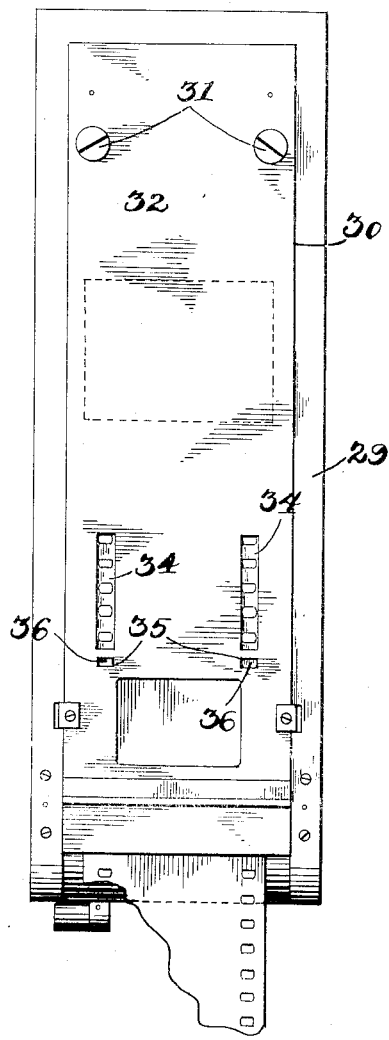
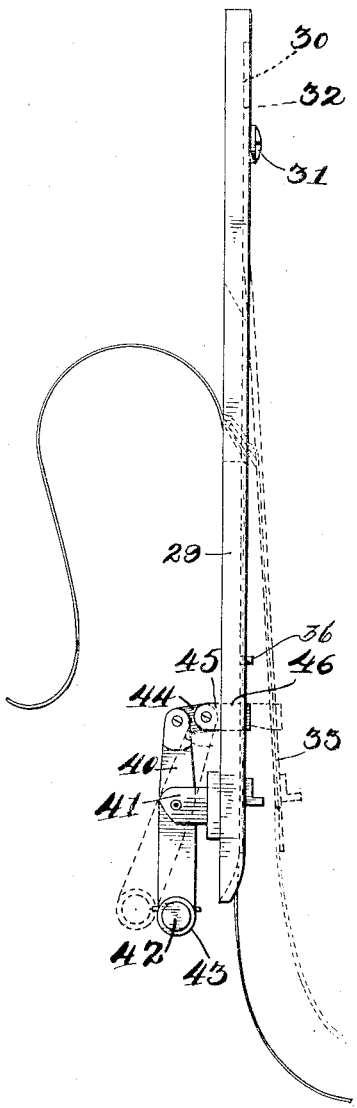
Witnesses:
W. H. Eichelman
M. A. Milord
Inventor:
Albert S. Howell
By Frederick Benjamin
Atty.

UNITED STATES PATENT OFFICE.

ALBERT S. HOWELL, OF CHICAGO, ILLINOIS, ASSIGNOR TO BELL & HOWELL CO., OF CHICAGO, ILLINOIS, A CORPORATION OF ILLINOIS.

MOTION-PICTURE MACHINE.

1,038,586.   Specification of Letters Patent.   Patented Sept. 17, 1912.

Application filed October 25, 1911, Serial No. 656,698. Renewed July 26, 1912. Serial No. 711,731.

*To all whom it may concern:*

Be it known that I, ALBERT S. HOWELL, a citizen of the United States, residing at Chicago, in the county of Cook and State of Illinois, have invented certain new and useful Improvements in Motion-Picture Machines, of which the following is a specification.

My present invention has relation to improvements in motion picture machines, and has special reference to the provision of a simple, and effective mechanism for feeding the film intermittently or step by step which shall have a high degree of accuracy so that the film will be moved exactly the required distance each time.

I have shown my invention embodied in a motion picture camera.

Figure 1:
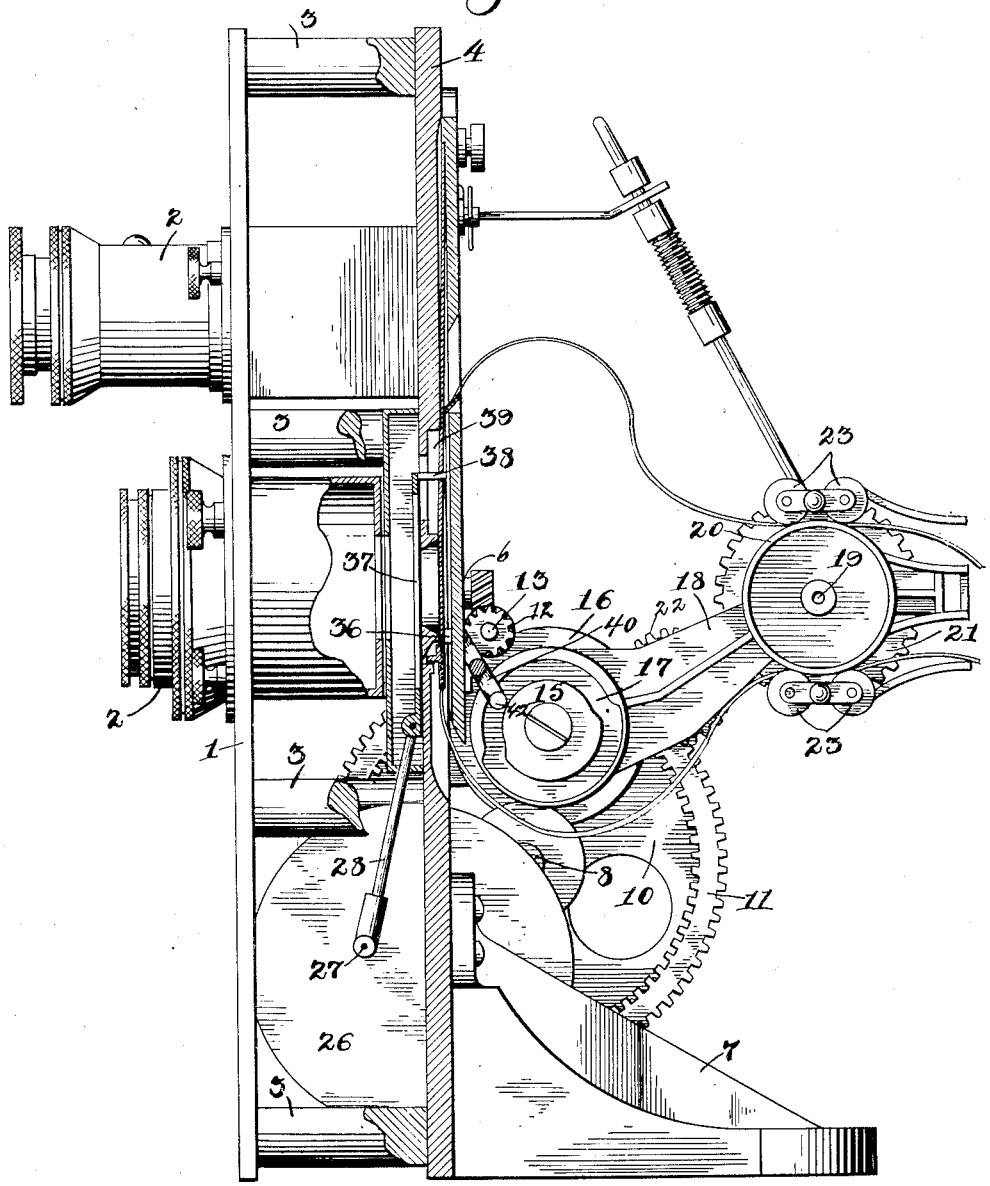
Figure 2:
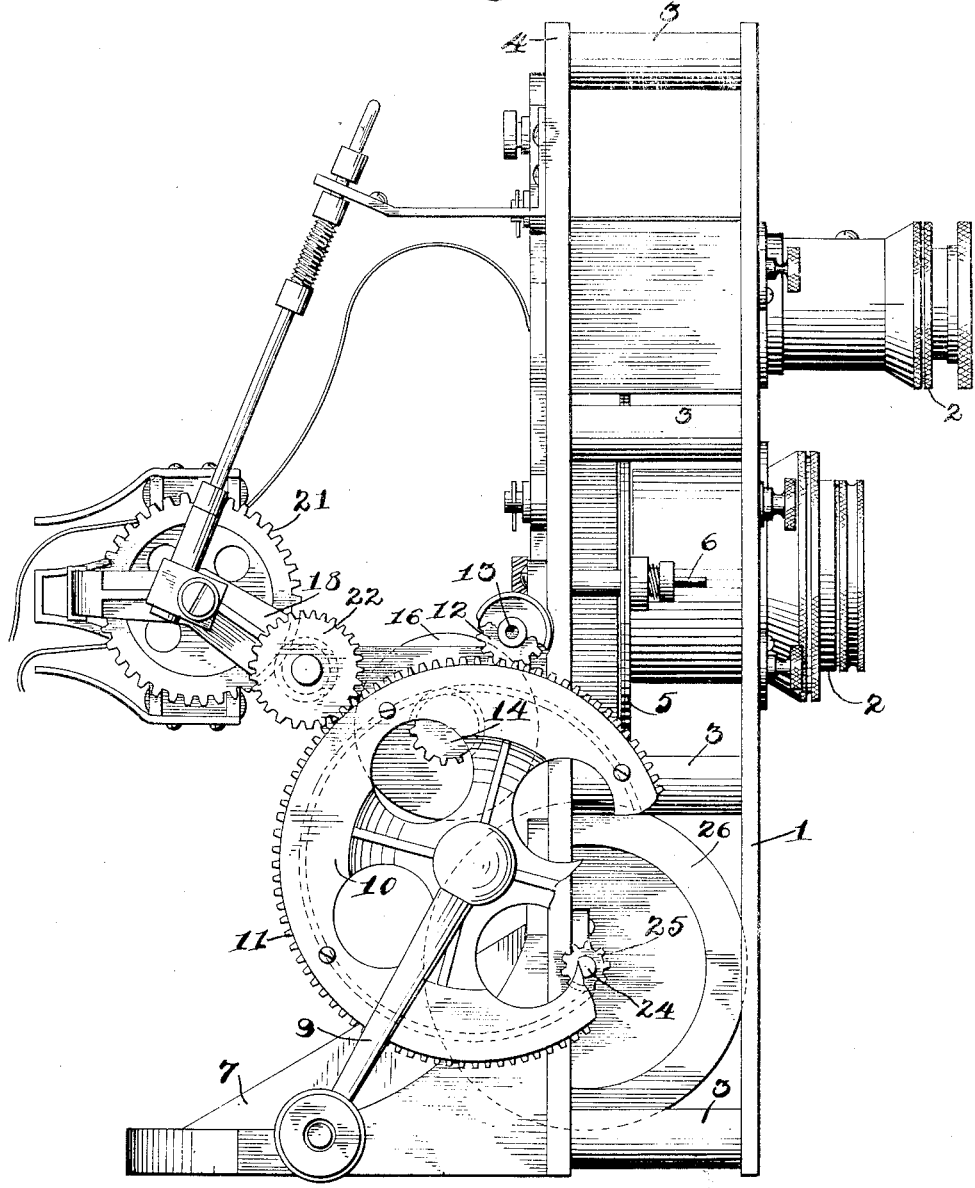

In the drawings:—Figure 1 is an elevation of one side of a motion picture camera partially in section, in which my invention is embodied, which shows the manner of actuating the feeding means; Fig. 2 is an elevation of the other side of the structure shown in Fig. 1, in which the relations of the gear trains are shown; Fig. 3 is a front elevation of the plate through which the film is fed, and Fig. 4 is a side view of the plate shown in Fig. 3.

Similar reference numerals refer to similar parts throughout the several views.

Referring more particularly to Figs. 1 and 2, the reference numeral 1 designates a front plate in which are provided the lens mountings, 2. The plate 1 is secured by means of the rods, 3, with a back or rear plate, 4, which carries the mechanism. Between the plates 1 and 4 is mounted a suitable shutter 5 on an arbor 6. Secured to the lower portion of the plate 4 is a base bracket 7.

Journaled in a suitable bracket, not shown, but extending rearwardly from the plate 4 is a transverse shaft 8, (shown in Fig. 1) upon one end of which is a crank, 9, (shown in Fig. 2) with which to drive the mechanism. Mounted upon the shaft 8, just inside of the crank, 9, is a disk, 10, near the periphery of which is a laterally projecting annular extension 11, both the inner and outer edges of which are provided with gear teeth. The outer gear teeth upon the extension, 11, engage a gear, 12, upon a transverse arbor, 13, which is suitably geared at one end of the arbor, 6, to drive the shutter. The inner teeth of the extension, 11, engage a gear, 14, upon a short transverse arbor, 15, upon the outer end of which is a disk, 16, upon the face of which is provided a routed cam or cam slot, 17, for driving a portion of the feeding mechanism to be described hereafter.

Suitable brackets, 18, extend some distance back of the plate, 4, and in these is journaled a shaft, 19, upon which is mounted a drum, 20, for feeding the film to and taking it from the intermittent feeding mechanism. Upon the end of the shaft, 19, is a gear, 21, which meshes with an intermediate gear combination, 22, which in its turn meshes with the teeth upon the outer edge of the extension, 11. Suitable rollers, 23, hold the film to the drum, 20. Extending transversely of the machine and lower down is another shaft, 24, which meshes by means of a gear, 25, with the inner teeth of the extension, 11, and upon the end of this shaft is a disk 26 which has a stud, 27, extending from the face thereof to which is secured a pitman, 28.

The feeding mechanism proper is made as follows: In a suitable vertical opening in the plate, 4, is secured a plate, 29, clearly shown in elevation in Fig. 3. This plate is comparatively thick, and in the anterior side thereof is a vertical depression, 30, into which is secured by means of the screws, 31, a flexible plate, 32. The vertical edges of the lower portion of the plate 32 are built up and across the built up edges is provided a back plate which forms a guide way, 33, in the lower portion of the flexible plate 32, for the passage of the film. Through the portion of the plate, 32, in which the guide way, 33, is provided, are the vertical parallel slots 34, under each of which is a small detached aperture, 35. Pins 36 are provided upon the plate, 29, which extend through the apertures, 35, when the lower part of the plate is close to the plate 29 and within the depression, 30. Mounted to slide vertically in suitable guideways upon the anterior side of the plate 4, is a plate, 37, which has backwardly extending pins, 38 therein which extend through slots, 39, in the plate 4, opposite the channels 34 in the plate 32. The length of the pins, 38, is so arranged that they extend into said channels 34, when the lower unattached end of the flexible plate 34 is pushed forward out of the depression, 30, but clear said channel when the plate 32 is within the depression, 30. The pitman, 28, connects with the plate, 37, and reciprocates it. To move the lower end of the flexible plate, 32, out of and withdraw it within the depression, 30, and thereby alternately subject the film in the passageway, 33, to the action of the vertically reciprocating pins, 38, and the fixed pins, 36, I have provided the rocker arm, 40, pivoted in a bracket, 41, upon the posterior side of the plate, 29. Upon the lower end of the rocker arm 40, is a laterally extending lug, 42, which is provided with a friction bushing or collar 43 and which extends into the routed cam or cam slot, 17, in the face of the disk 16. The upper end of the rocker arm, 40, is connected by means of a link, 44, which connects with a bracket, 45, upon the posterior side of the flexible plate, 30, and which extends through an aperture 46, in the plate 29.

It will now be seen from the foregoing description, taken in connection with the drawings, that the edges of film which are perforated and which pass through the film guide way, 33, are caused to engage with and disengage from the reciprocating pins 38, by the simple movement of the lower end of the flexible plate, 32, and that when the pins 38 are out of engagement the film is in engagement with the stationary pins 36 which effectually prevents any movement or slipping between the feed strokes or steps.

Having thus described my invention, what I claim as new, is:—

1. A film feeding mechanism comprising a film guide way, means for shifting said guide way transversely to its direction, reciprocating pins adapted to extend into said guide way and engage film therein in one position of said guide way, and fixed pins adapted to extend into said guide way and engage said film in the other position.

2. A film feeding mechanism comprising reciprocating pins, a flexible film guide way and means for flexing said guide way to bring it into and out of the path of reciprocation of said pins.

3. A film feeding mechanism comprising pins, means for reciprocating said pins, a film guide way movable transversely to its direction, and means for moving said guide way into and out of the path of reciprocation of said pins.

In testimony whereof I affix my signature in the presence of two witnesses.

ALBERT S. HOWELL.

Witnesses:
H. De Los Higman,
M. A. Milord.